Dec. 8, 1925.
A. N. BLANCHARD
1,564,820
AUTOMATIC LUBRICATOR FOR AIR TOOLS
Filed Nov. 24, 1924
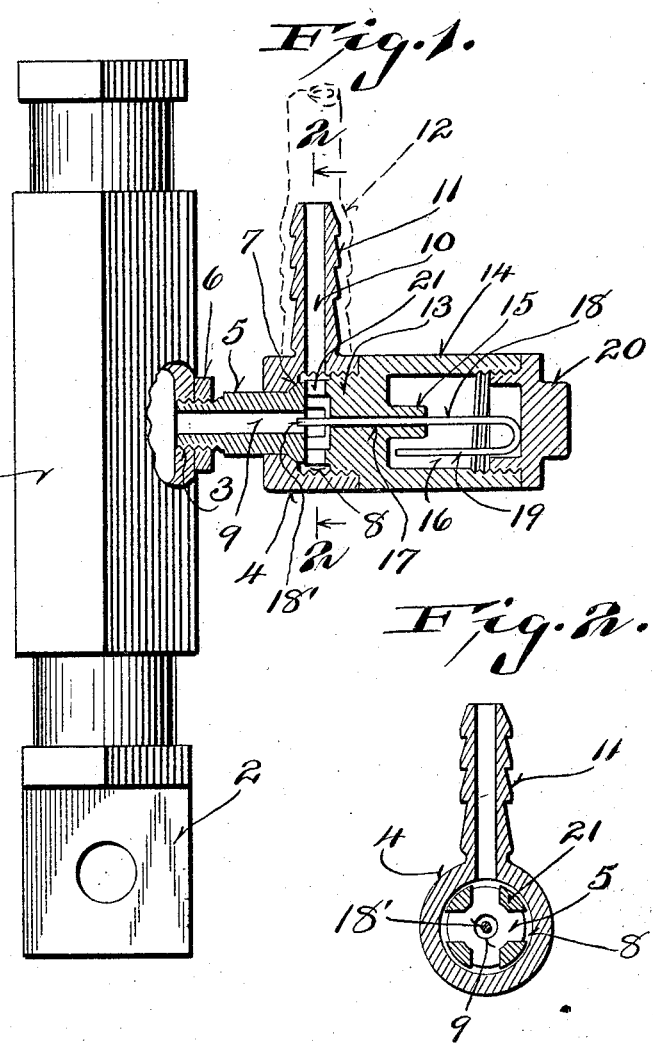
Inventor
Arthur N. Blanchard Patented Dec. 8, 1925.

1,564,820

UNITED STATES PATENT OFFICE.

ARTHUR N. BLANCHARD, OF MILWAUKEE, WISCONSIN.

AUTOMATIC LUBRICATOR FOR AIR TOOLS.

Application filed November 24, 1924. Serial No. 751,956.

*To all whom it may concern:*

Be it known that I, ARTHUR N. BLANCHARD, a citizen of the United States, and resident of Milwaukee, in the county of Milwaukee and State of Wisconsin, have invented certain new and useful Improvements in Automatic Lubricators for Air Tools; and I do hereby declare that the following is a full, clear, and exact description thereof.

This invention relates to an automatic lubricator for air tools and is particularly directed to a lubricator adapted for vibrators.

In foundries it has been the practice to provide compressed air vibrators for moulding. It has been found, however, that these vibrators had to be frequently opened, cleaned and oiled in order to keep them in good operating condition and to prevent rusting of the internal parts due to the moisture carried by the compressed air.

Further than this, the compressed air hose or pipe at its point of attachment to the vibrator did not provide the necessary flexibility and freedom of movement.

This invention is designed to overcome the above noted defects, and objects of such invention are to provide an automatic lubricator so constructed that it will furnish the necessary lubricant to the flowing stream of air passing to the vibrator, and will also permit swivel motion to occur between the vibrator and the compressed air pipe or the supply pipe.

Further objects are to provide a combined automatic lubricator and swivel connection for the pneumatic vibrator which is so constructed that the lubricant is fed to the flowing stream of air in all positions of relative adjustment of the vibrator and the hose or supply pipe, and in which the lubricant is fed by means of capillary action in a simple and effective manner.

Further objects are to provide an automatic lubricator and swivel connection in which the swivel joint is maintained tight by means of the air pressure, and to provide a device which may be most easily refilled with lubricant when needed.

An embodiment of the invention is shown in the accompanying drawings, in which:—

Figure 1 is an elevation of a pneumatic vibrator with the device attached thereto, such device being shown in section.

Figure 2 is a transverse section through the device taken on the line 2—2 of Figure 1.

Referring to the drawings, it will be seen that a conventional compressed air vibrator 1 has been shown, which as is customary, may be provided with a vibrating piston or plunger. It is equipped with an apertured head 2 to adapt it to be attached to suitable implements in the usual manner. The body portion 1 is provided with a threaded inlet aperture 3 in the usual manner.

The automatic lubricator and swivel attachment comprises a body portion 4 from which projects a swivelly mounted tubular member 5. This tubular member has a threaded end which is screwed into the aperture 3 and such tube is locked in place by means of a lock nut 6. The outer end of the tubular member is beveled, as indicated at 7, and fits a correspondingly beveled portion of the body portion 4 of the automatic lubricator. This body portion is provided with an air chamber 8 which communicates with the passage 9 of the tubular member, and which further communicates with the passage 10 of an extension 11, such extension being adapted to receive the supply pipe 12 for the compressed air.

The rear end or outer end of the body portion 4 is internally threaded and receives the threaded reduced portion 13 of an oil reservoir 14. This oil reservoir is provided with a rearwardly projecting boss 15 projecting into the oil cavity 16. A passageway or aperture 17 extends through the front wall of the reservoir and through the boss 15 and communicates with the air chamber 8 of the body portion 4. A small rod or wire 18 loosely projects through the aperture 17 and has one end 18' projecting into the passage 9 of the tube 5 a slight distance. This wire has a reversely curved portion or arm 19 which fits within the reservoir and keeps the wire from moving out of position. A removable filling plug 20 is screwed into the outer end of the reservoir and is adapted to limit the rearward movement of the wire 18, as will be apparent from a consideration of Figure 1.

It is to be noted that the beveled portion 7 of the tube 5 is held seated against the correspondingly beveled portion of the body part 4 by the air pressure However, the reduced portion 13 of the reservoir is provided with a plurality of lugs 21 at spaced intervals which are positioned rearwardly of the tube 5 but are not clamped tightly against such tube. These projections hold the tube in substantially correct position and insures its ready seating by the air pressure.

In operation, it will be noted that the vibrator may swivel with reference to the supply pipe in any desired manner and that, thereafter, the utmost freedom of manipulation is afforded. It will be noted further that the loose fitting wire 18 positioned within the aperture 17 feeds the lubricant through such aperture by capillary action. Further, as the end 18' of the wire projects slightly into the passageway 9 of the tube 5, it will be seen that the film of lubricant adhering to the wire will be swept into the passageway by the flowing air stream. Additional lubricant is fed to this portion of the wire by capillary action noted above, and therefore a minute quantity of oil is constantly fed to the vibrator while it is in operation. Rusting and sticking of the vibrator is therefore wholly avoided by this invention, and the utmost freedom of manipulation is attained.

Although the invention has been described in considerable detail, it is to be understood that the invention may be variously embodied and is, therefore, to be limited only as claimed.

I claim:

1. The combination of an air tool, a supply pipe therefor, and a lubricating device having a body portion connected with said supply pipe and having a projecting tubular member swivelly joined to said body portion and rigidly joined to said air tool, said device having a reservoir for the lubricant and having capillary means for feeding such lubricant into the air stream.

2. A lubricator for a compressed air tool comprising a body portion having an air chamber adapted for communication with the compressed air supply, a tubular member communicating with said chamber and swivelly joined to said body portion and adapted for rigid attachment to said air tool, said body portion having a reservoir for lubricant, and means for feeding lubricant by capillary action into said air chamber and thus into the air stream.

3. A lubricator for a compressed air tool comprising a body portion having an air chamber and provided with means for attachment to a supply pipe, a projecting tubular outlet member swivelly joined to said body portion and communicating with said air chamber and adapted to be seated upon said body portion by the air pressure, said body portion having a lubricant reservoir screwed into one end of said air chamber and having projections loosely holding said tubular member in its correct position, and having a passageway placing said reservoir in communication with said air chamber, and a wire loosely positioned within said passageway.

4. A lubricator for a compressed air tool comprising a body portion having an air chamber and provided with means for attachment to a supply pipe, a projecting tubular outlet member swivelly joined to said body portion and communicating with said air chamber and adapted to be seated upon said body portion by the air pressure, said body portion having a lubricant reservoir screwed into one end of said air chamber and having projections loosely holding said tubular member in its correct position, and having a passageway placing said reservoir in communication with said air chamber, and a wire loosely positioned within said passageway, and projecting into said tubular member, said wire having means thereon for retaining it in position.

5. A device for fluid pressure apparatus comprising a supply pipe receiving member, a connecting member swivelly carried by said supply pipe receiving member and adapted for rigid connection with a fluid pressure apparatus, means carried by the supply pipe receiving member to prevent longitudinal movement between the supply pipe and the receiving member, and means for introducing oil into the pressure fluid supply.

In testimony that I claim the foregoing I have hereunto set my hand at Milwaukee, in the county of Milwaukee and State of Wisconsin.

ARTHUR N. BLANCHARD.